United States Patent [19]
Hoshino

[11] Patent Number: 5,146,808
[45] Date of Patent: Sep. 15, 1992

[54] ANGLE ADJUSTING MECHANISM FOR AN ARTICLE SUPPORT

[75] Inventor: Yoshihiro Hoshino, Nagoya, Japan

[73] Assignee: Hoshino Gakki Co., Ltd., Japan

[21] Appl. No.: 596,485

[22] Filed: Oct. 12, 1990

[30] Foreign Application Priority Data

Jun. 28, 1990 [JP] Japan .................. 2-171136

[51] Int. Cl.⁵ .................................. G05G 5/06
[52] U.S. Cl. ............................ 74/531; 248/284; 403/91
[58] Field of Search ............ 74/531; 403/83, 84, 403/91; 248/284, 285, 291

[56] References Cited

U.S. PATENT DOCUMENTS

| | | | |
|---|---|---|---|
| 3,304,037 | 2/1967 | Candela | 248/284 X |
| 3,505,515 | 4/1971 | Adra | 248/291 |
| 3,890,672 | 6/1975 | Berthagen | 403/91 X |
| 3,987,687 | 10/1976 | Bland et al. | 74/531 X |
| 4,543,007 | 9/1985 | Quiogue | 403/91 X |
| 4,608,879 | 9/1986 | Ishida et al. | 74/531 X |
| 4,880,331 | 11/1989 | Zun | 403/91 X |

Primary Examiner—Dirk Wright
Attorney, Agent, or Firm—Ostrolenk, Faber, Gerb & Soffen

[57] ABSTRACT

An angle adjusting mechanism for a supported article includes a fixedly positioned holding member and a rotary member relatively rotatable with respect to the holding member. A plurality of plates are disposed between the rotary and holding members. The holding member is provided with a plurality of claw teeth at the inner periphery of one arcuate segment and the rotary member is provided with a respective plurality of claw teeth over a different arcuate segment of the inner periphery thereof. A first plurality of fixed plates, including claw teeth on their peripheries, engage the teeth of the holding member, on a second plurality of rotary plates, including claw teeth on their peripheries, engage the claw teeth on the inner periphery of the rotary member. A clamping bolt is provided to draw the rotary and holding members together and compress the fixed and rotary plates together fixing their relative orientations, thereby to fix the rotative (angular) orientation of the rotary member with respect to the holding member.

18 Claims, 4 Drawing Sheets

ANGLE ADJUSTING MECHANISM FOR AN ARTICLE SUPPORT

BACKGROUND OF THE INVENTION

This invention relates to an angle adjusting mechanism for an article support, and particularly a mechanism comprising a rotary member on the movable side which cooperates with a holding member on the fixed side, and they are freely rotatable and may be tightened together to be held at a desired relative rotation angle.

In one known possible use for the invention, the installation of an audio speaker on a ceiling, as shown in prior art FIG. 6 herein, for instance, the bearing rotary member 94 of a prior art installation bracket 93 of the speaker S are combined, so as to be freely tightened to the axial part 91 of the holding member 90 that is fixed to the ceiling. This holds the rotary member 94 at a desired rotation angle. A cut groove 95 is formed through the ring of the bearing rotary member 94 and the split ring at the cut groove 95 is loosened by rotation of an "eye bolt" 96 to loosen the member 94 for rotation and to then tighten the member 94 to maintain the fixed axial part 91 and member 94 at a desired angle, as shown by the dotted line in FIG. 6, thereby adjusting the installation angle of the speaker S.

In this conventional mechanism, however, the retention of the speaker S at the selected orientation is influenced by the gripping force of the bolt 96 tightened to bear the rotary member 94 against the axial part 91. As a result, it has been necessary to increase the size of the rotary members 91 and 94 where the load on the speaker side is excessively heavy. Also, where the angle of incline of the speakers is large, there is a further need to increase the size of the member 94 for increasing the gripping force, due to the larger torque that is generated on the member 94. However, there are restrictions that makes unacceptable increase in the size of the angle adjusting mechanism from the standpoints of the installation space and the external appearance in addition to the disadvantage of increased overall weight.

SUMMARY OF THE INVENTION

It is an object of the invention to provide an angle adjusting mechanism capable of adjustment to a desired angle without additional steps to provide the necessary and sufficient holding power in response to the load generated.

It is a further object of the invention to provide a new angle adjusting mechanism with a superior design, which is capable of being compactly accommodated in a comparatively narrow space without being exposed or enlarged to the exterior.

In the angle adjusting mechanism of the invention, there is a relatively rotatable rotary member located on the movable side which is freely rotatable with respect to and tightenable at a selective rotative orientation to a relatively stationary holding member on the fixed side. They are held at a desired relative rotation angle by a plurality of friction plates between the holding member and rotary member. First fixed ones of the friction plates include a rotative orientation fixing means in the form of a claw part that engages a rotative orientation fixing means in the form of a cooperating claw part on the outer periphery of the holding member. Second rotatable ones of the friction plates also include a rotative orientation fixing means in the form of a claw part that engages a rotative orientation fixing means in the form of a cooperating claw part on the outer periphery of the rotary member. The friction plates are arranged with the first and second plates alternating, and the plates are arranged side by side. After the desired rotary angle orientations of the rotary and holding members are set, the plates are compressively tightened together to be effectively mutually adhered.

The tightening together of the friction plates further produces friction forces at the contact surfaces between the first friction plates that engage the holding member and the second friction plates that engage the rotary member. These friction forces regulate the movement between the holding member and the rotary member to maintain their prescribed orientations. The friction forces vary in response to the size and quantity of the friction plates used. Adjusting these parameters enables provision of the required holding power for the particular load generated.

Other objects and features of the invention are explained with reference to the drawings.

DESCRIPTION OF A PREFERRED EMBODIMENT

Figure 1:
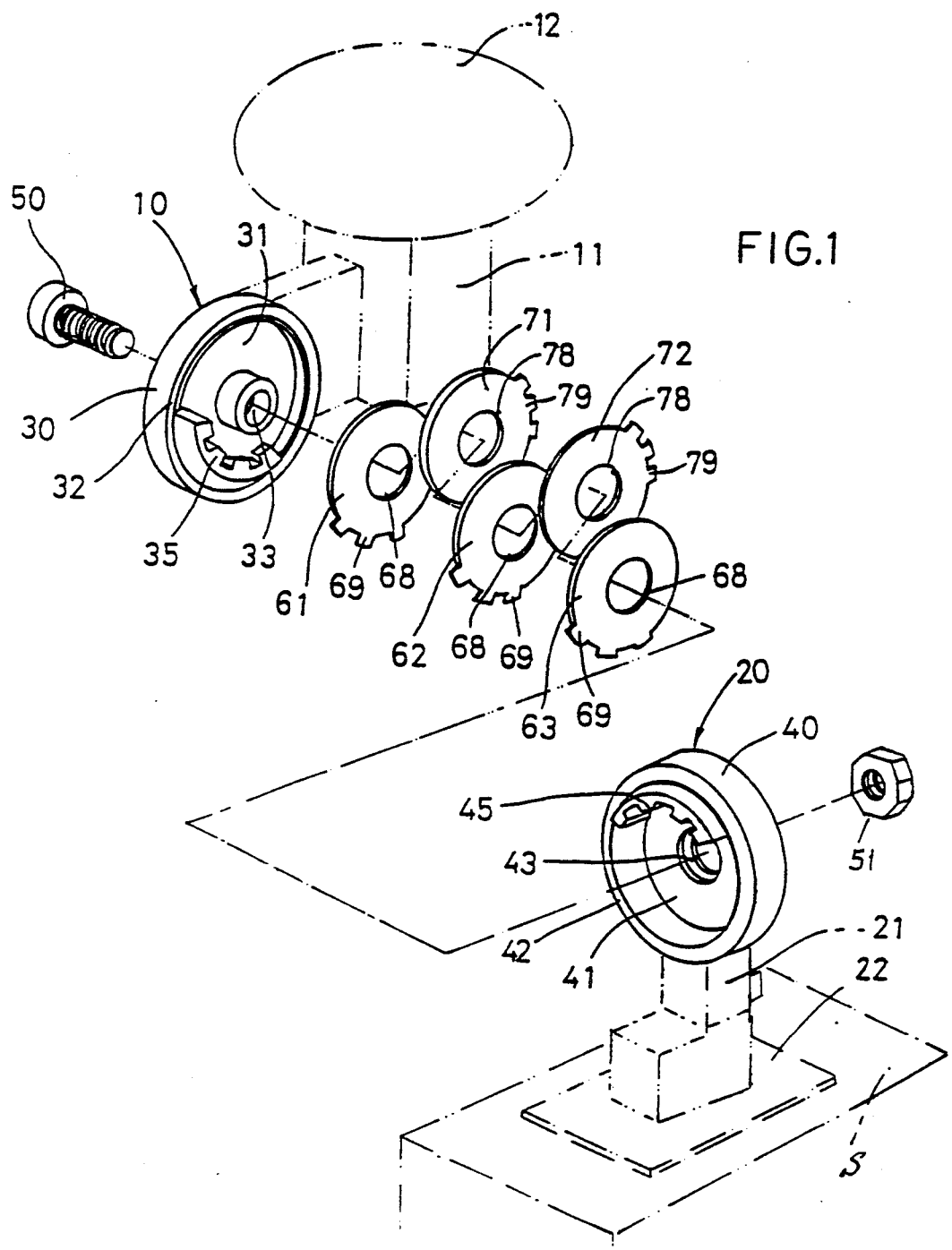
FIG. 1 is an oblique expanded view of an embodiment of the invention, showing the essential parts of the angle a mechanism for a supported speaker, or the FIG. 2 is a vertical cross-section of the invention showing the combination of its parts.

The example of the invention shown in the drawings relates to a mechanism for hanging an audio speaker from a ceiling or from a wall surface F. But other uses and particularly the support of other articles is within the scope of the invention. The rotary member 20 at the supported speaker, which is at the movable side, is freely rotatable in its rotative orientation with respect to and then is tightened to the holding member 10 on the ceiling F side (the fixed side). This enables the speaker and its supporting rotary member 20 to be held at a desired rotation angle with respect to the holding member 10.

There is a bracket 11 on the fixed side to which the holding member 10 is supported. There is an installation plate or tool 12 there on the ceiling for the bracket 11. There is a bracket 21 on the movable side attached to the rotary member and a speaker installing plate or tool 22 on the speaker to which the bracket 21 is attached.

The holding member 10 and the rotary member 20 comprise main bodies 30 and 40, respectively, which are obtained by dividing a cylindrical body in two in the circumferential direction, i.e. across the axis. The bodies 30 and 40 are mutually combined with their respective openings or inside cavities 31 and 41 facing toward one another. Cavities 31 and 41 are partially bounded by have respective peripheral flanges 32, 42 which extend toward each other without abutting.

The holding member 10 and the rotary member 20 are tightened together by inserting the shank of a bolt 50 through the threadably engaged by holes 33 and 43 to be screwed nut 51, as shown in FIG. 1.

A first plurality of friction plates 61, 62, 63, etc. for the holding member 10 and a second plurality of holding plates 71, 72, etc. for the rotary member 20 alternate with one another between the holding member 10 and rotary member 20. The friction plates 61, 62, 63, 71, 72, etc. are accommodated inside the cavities or openings 31 and 41 of the holding member 10 and rotary member 20. The bolt 50 is also inserted through the screw holes 68 and 78 in the friction plates 61, etc. and 91, etc. and into the nut 51. The bolt 50, and nut 51 are tightened to effectively integrate the members 10 and 20 and the plates 61, etc. and 71, etc. into one unit.

Each fixed friction plate 61, 62, 63 on the holding side includes a first rotative orientation fixing means in the form of an outwardly projecting claw part (teeth) 69 on its outer periphery that engages a rotative orientation fixing means in the form of a complementary claw part (teeth) 35 that projects inward from the flange 32 on the periphery of the holding member 10. Each rotatable friction plate 71, 72 on the rotary side includes a second rotative orientation fixing means in the form of an outwardly projecting claw part (teeth) 79 on its outer periphery that engages a rotative orientation fixing means in the form of a second engaging part 45 that projects inward from the flange 42 on the periphery of the rotary member 20.

The friction plates 61, 62, 63, and 71, 72 can be of the same construction, and that is desirable for economy.

The first and second engaging parts 35 and 45 of the holding member 10 and rotary member 20, respectively, can be of any form, provided that they are constructed to engage with the respective claw parts 69 and 79 of the respective friction plates 61, etc. and 71, etc. Claw parts 69 and 79 to comprise a plurality of radial protrusions or teeth and the engaging parts 35 and 45 comprise complementary concavo-convex step parts or teeth, as shown. The claw parts 69 and 79 are of respective arcuate lengths that approximate the arcuate lengths of their respective claw parts 35 and 45.

Figure 2:
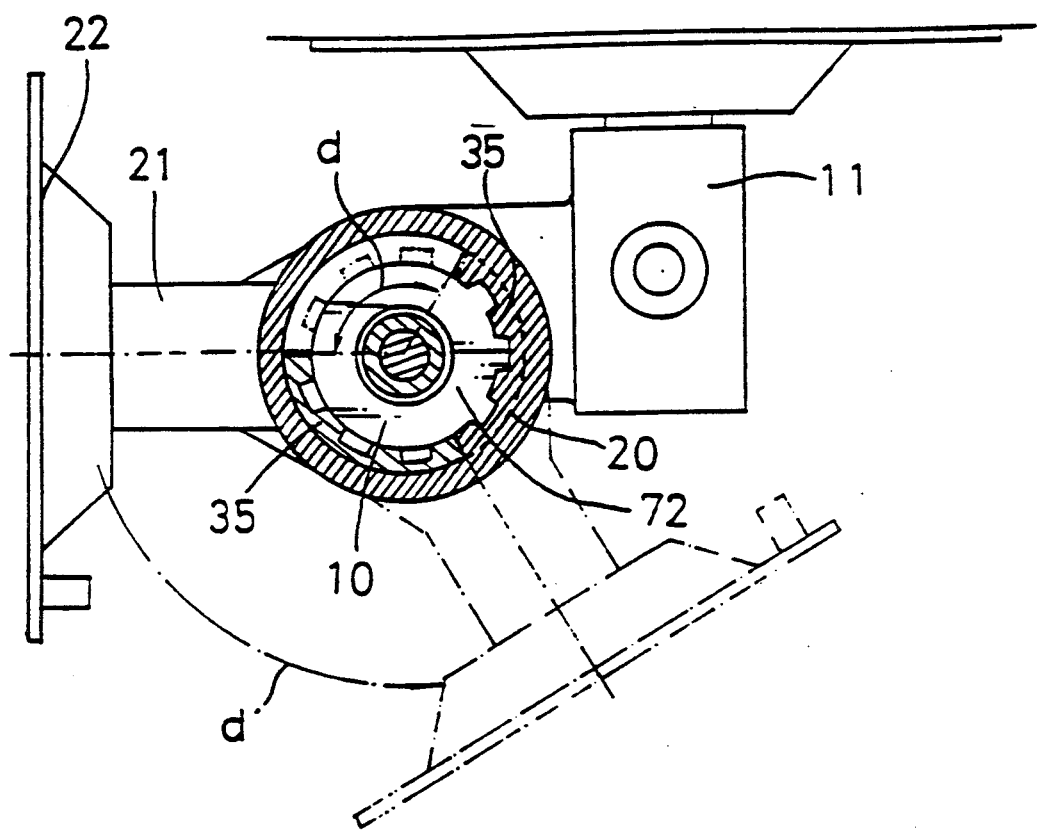

In the illustrated embodiment of FIG. 2 the engaging part 45 of the rotary member and the engaging part 35 of the fixed member 10 are of such arcuate lengths and are so placed that their opposite ends abut after relative motion through a rotary angle d of 120 degrees. As a result, the range of angular adjustment d in this example will be 120 degrees, as shown in FIG. 2.

Figure 3:
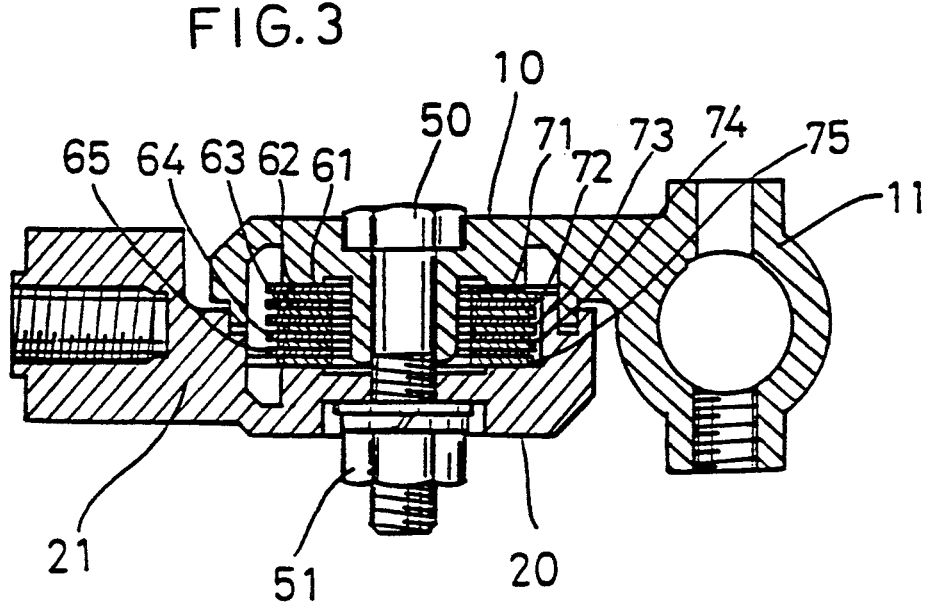
FIG. 3 is a transverse cross-section of the invention.
Figure 4:
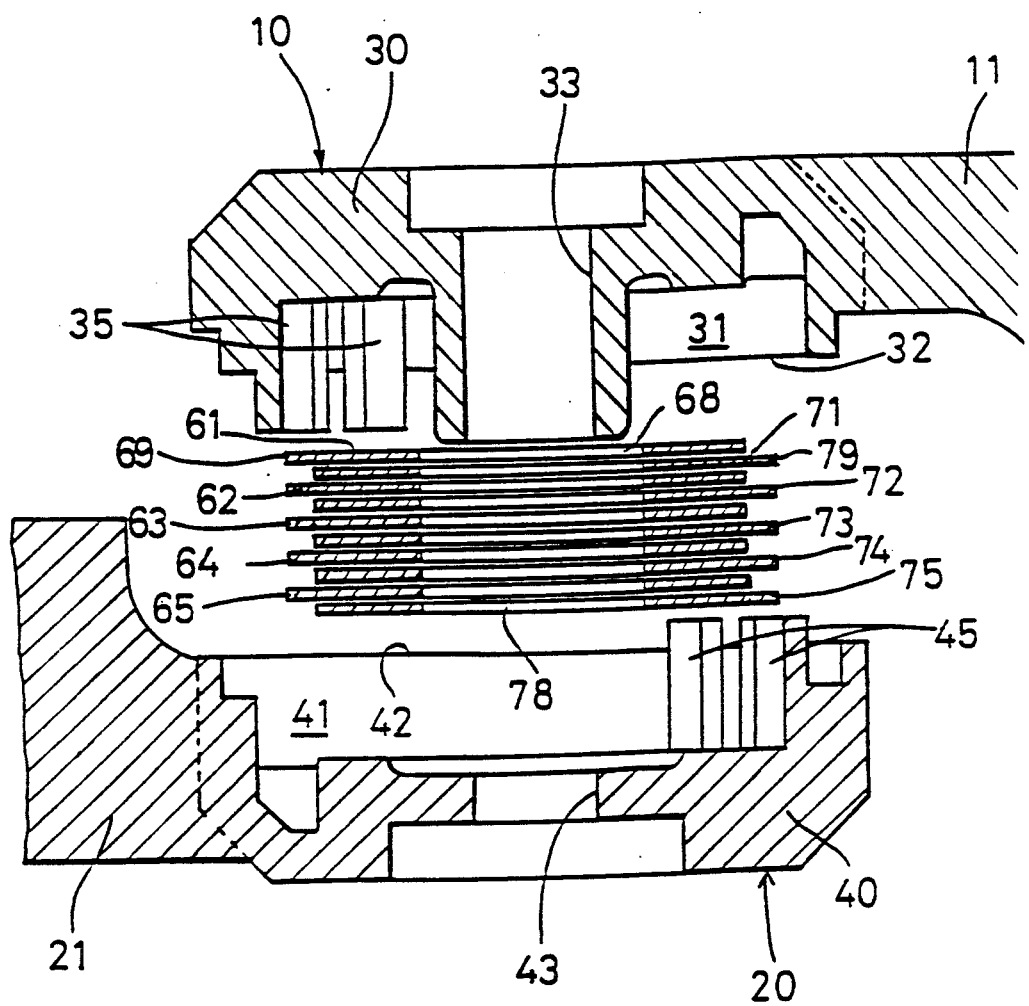
FIG. 4 is a cross-section showing the fixed member, the rotary member and the plates exploded from one another.

As can be seen from FIG. 1 and from the cross sections in FIGS. 3 and 4, the friction plates 61, 62, 63 on the holding side and the friction plates 71, 72 on the rotary side are arranged alternately so as to mutually increase the cooperating friction area.

As these friction plates are compressively tightened together by means of the bolt 50 and the nut 51, a friction force is produced on the contact surfaces between the friction plates 61, 62, 63 on the holding side that engage the holding member 10 and the friction plates 71, 72 on the rotary side that engage the rotary member 20, and this friction force regulates the movement between the holding member 10 and the rotary member 20, effecting positional holding at prescribed orientations.

The frictional force that is produced on the contact surfaces changes according to the size diameter and number of the friction plates, thereby making it possible to set a holding force that is required for holding the rotary member. The size of the claw part and the engaging force can also be selected.

Figure 5:
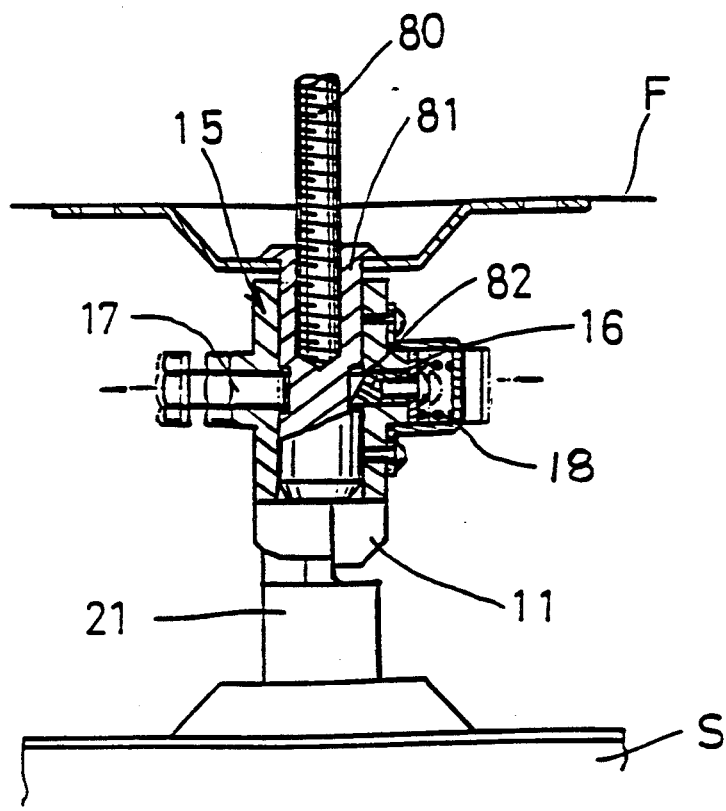
FIG. 5 is a cross-section showing the installed structure affixed to a ceiling.
Figure 6:
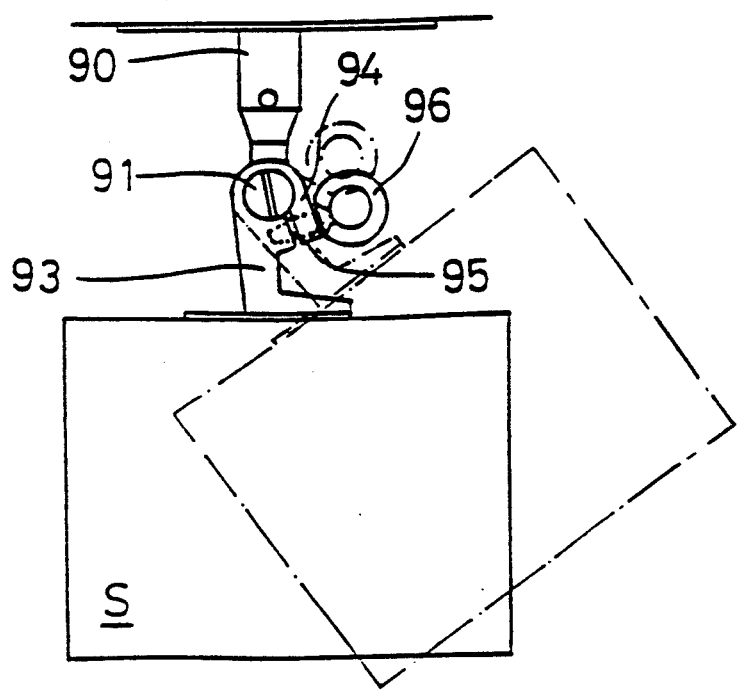
FIG. 6 illustrates a prior art installation.

FIG. 5 shows a cross section of the installation structure of the ceiling fixed part. A fixed holding member 81 having a groove 82 on its peripheral surface is screwed to the tip at the lower end of a screw bar 80 that is fixed to a beam (not shown) inside the ceiling. This installation can be effected by rotating, with one touch of the finger, the external connective member 15 of the bracket 11 on the fixed side around the fixed holding member 81 inside. A pin 16 of the connective member 15 is elastically provided on the outer peripheral groove through a spring 18. Installation is completed by a safety bolt 17 on the opposite side.

A mechanism for installing an audio speakers at a desired tilt orientation on a ceiling F has been shown. However, the invention can also be used for holding illuminating instruments in an inclined fashion, a boom holding mechanism for a microphone stand, and a cymbal stand, etc. The uses are almost limitless.

As has been explained above, friction plates that engage with the engaging part of the holding member and friction plates that engage with the engaging part of the rotary member are arranged in alternating sequence between the holding member and rotary member. Compressive tightening of the plates produces friction force between them and maintains the prescribed position by regulating the movement between the holding member and rotary member according to the angle adjusting mechanism of this invention.

Accordingly, it is not only possible to effect an adjustment of the rotative angle to a desired angle without steps (continuous) but it is also possible to set a necessary and sufficient holding force in response to the load that is being supported.

It becomes easily possible with the invention to withstand a large load by selecting the size and number of the friction plates used. In such a case, moreover, the mechanism itself does not have to be exposed externally but can be compactly accommodated in a small space. In this manner, this invention offers a useful angle adjusting mechanism, which is safe, superior in terms of design and highly practical.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A rotation angle adjusting mechanism for adjusting the relative rotative position of a rotary member with respect to a fixed position holding member, the rotation angle adjusting mechanism comprising:
   the holding member including first rotative orientation fixing means; at least one fixed side friction plate, including second rotative orientation fixing means thereon which are in engagement with the first rotative orientation fixing means such that the relative rotative orientations of the fixed plate and the holding member are fixedly established;
   the rotary member including third rotative orientation fixing means; at least one rotary side friction plate, including fourth rotative orientation fixing means thereon which are in engagement with the third rotative orientation fixing means such that the relative rotative orientations of the rotary plate and the rotary member are fixedly established;

the fixed plate and the rotary plate having respective sides next to one another, the fixed and rotary plates being relatively rotatable with respect to each other permitting relative rotation of the rotary member with respect to the holding member;

means for selectively compressing the sides of the rotary holding plate and the fixed holding plate into friction engagement sufficient to prevent relative rotation of the rotatable plate and the fixed plate with respect to each other for fixing the orientation of the rotary member and the holding member with respect to each other at a selected rotative orientation;

the holding member having a first periphery and the first rotative orientation fixing means is disposed at the periphery of the holding member;

the rotary member having a third periphery and the third rotative orientation fixing means is disposed at the third periphery of the rotary member;

the fixed plate having a second periphery and the second rotative orientation fixing means is at the second periphery of the fixed plate;

the rotary plate having a fourth periphery and the fourth rotative orientation fixing means is located at the fourth periphery of the rotary plate;

the first, second, third and fourth rotative orientation fixing means comprising respective first, second, third and fourth claw parts placed and shaped such that the first and second claw parts of the first and second rotative orientation fixing means engage and the third and fourth claw parts of the third and fourth rotative orientation fixing means engage.

2. The angle adjusting mechanism of claim 1, wherein the first claw part of the first rotative orientation fixing means extends around a first arcuate section of the holding means less than the entire first periphery thereof; and the third claw part of the third rotative orientation fixing means extends around a second arcuate section of the rotary member less than the entire third periphery thereof.

3. The angle adjusting mechanism of claim 2, wherein the first and second arcuate sections occupied by the first and third claw parts around the circumferences of the rotary and holding members is such that the claw parts extend over different respective arcuate regions around the holding and rotary members.

4. A rotation angle adjusting mechanism for adjusting the relative rotative position of a rotary member with respect to a fixed position holding member, the rotation angle adjusting mechanism comprising:

the holding member including first rotative orientation fixing means; at lest one fixed side friction plate, including second rotative orientation fixing means thereon which are in engagement with the first rotative orientation fixing means such that the relative rotative orientations of the fixed plate and the holding member are fixedly established;

the rotary member including third rotative orientation fixing means; at least one rotary side friction plate, including fourth rotative orientation fixing means thereon which are in engagement with the third rotative orientation fixing means such that the relative rotative orientations of the rotary plate and the rotary member are fixedly established;

the fixed plate and the rotary plate having respective sides next to one another, the fixed and rotary plates being relatively rotatable with respect to each other permitting relative rotation of the rotary member with respect to the holding member;

means for selectively compressing the sides of the rotary holding plate and the fixed holding plate into friction engagement sufficient to prevent relative rotation of the rotatable plate and the fixed plate with respect to each other for fixing the orientation of the rotary member and the holding member with respect to each other at a selected rotative orientation;

the holding member having a first periphery and the first rotative orientation fixing means is disposed at the periphery of the holding member;

the rotary member having a third periphery and the third rotative orientation fixing means is disposed at the third periphery of the rotary member;

the fixed plate having a second periphery and the second rotative orientation fixing means is at the second periphery of the fixed plate;

the rotary plate having a fourth periphery and the fourth rotative orientation fixing means is located at the fourth periphery of the rotary plate;

the first rotative orientation fixing means extending around a first arcuate section of the holding member less than the entire first periphery thereof; and the third rotative orientation fixing means extending around a second arcuate section of the rotary member less than the entire third periphery thereof.

5. The angle adjusting mechanism of claim 4, wherein the arcuate sections occupied by the first and third rotative orientation fixing means around the circumferences of the rotary and holding members is such that the rotative orientation fixing means extend over different respective arcuate regions around the holding and rotary members.

6. The angle adjusting mechanism of claim 4, further comprising means on the holding member and on the rotary member for cooperating and abutting for preventing rotation of the rotary member with respect to the holding member to a rotation orientation where the first and third rotative orientation fixing means would be at the same arcuate sections around the respective members.

7. The angle adjusting mechanism of claim 4, wherein the second rotative orientation fixing means extends over an arcuate section that is approximately the same arcuate section as the first rotative orientation fixing means; and the fourth rotative orientation fixing means extends over an arcuate section that is approximately the same arcuate section as the third rotative orientation fixing means.

8. A rotation angle adjusting mechanism for adjusting the relative rotative position of a rotary member with respect to a fixed position holding member, the rotation angle adjusting mechanism comprising:

the holding member including first rotative orientation fixing means; at least one fixed side friction plate, including second rotative orientation fixing means thereon which are in engagement with the first rotative orientation fixing means such that the relative rotative orientations of the fixed plate and the holding member are fixedly established;

the rotary member including third rotative orientation fixing means; at least one rotary side friction plate, including fourth rotative orientation fixing means thereon which are in engagement with the third rotative orientation fixing means such that the relative rotative orientations of the rotary plate and the rotary member are fixedly established;

the fixed plate and the rotary plate having respective sides next to one another, the fixed and rotary plates being relatively rotatable with respect to each other permitting relative rotation of the rotary member with respect to the holding member;

means for selectively compressing the sides of the rotary holding plate and the fixed holding plate into friction engagement sufficient to prevent relative rotation of the rotatable plate and the fixed plate with respect to each other for fixing the orientation of the rotary member and the holding member with respect to each other at a selected rotative orientation;

the holding member having a first periphery and the first rotative orientation fixing means is disposed at the periphery of the holding member;

the rotary member having a third periphery and the third rotative orientation fixing means is disposed at the third periphery of the rotary member;

the fixed plate having a second periphery and the second rotative orientation fixing means is at the second periphery of the fixed plate;

the rotary plate having a fourth periphery and the fourth rotative orientation fixing means is located at the fourth periphery of the rotary plate;

there are a plurality of the fixed plates, each having a respective one of the second rotative orientation fixing means which is in engagement with the first rotative orientation fixing means; and there are a plurality of the rotary plates, each having a respective one of the fourth rotative orientation fixing means which is in engagement with the third rotative orientation fixing means.

9. The angle adjusting mechanism of claim 8, wherein the fixed and rotary plates are arranged in an alternating sequence and the means for compressing the plates together squeezes the plates to frictionally engage the plates against relative rotation.

10. The angle adjusting mechanism of claim 9, further comprising a hub extending through the centers of the rotary and holding members and of the plates for defining a rotation axis for the rotary and holding members and for the plates.

11. The angle adjusting mechanism of claim 9, wherein the compression means is adapted for compressing the rotary member toward the holding member, and the plates are disposed between the rotary and holding members and are so shaped and positioned that tightening of the rotary and holding members together also compresses the plates between them.

12. The angle adjusting mechanism of claim 8, wherein the holding member has a first annular peripheral flange and the first rotative orientation fixing means is on the first annular peripheral flange and faces radially inwardly;

the rotary member has a second annular peripheral flange and the third rotative orientation fixing means is located on the second annular peripheral flange and faces inwardly; and the second and the fourth rotative orientation fixing means face radially outwardly to engage their respective first and third rotative orientation fixing means.

13. The angle adjusting mechanism of claim 12, wherein the holding and rotary members are so shaped as together be formed from a cylindrical body which is divided in two parts through the axis of the body.

14. An angle adjusting and holding mechanism including a holding member, a rotary member pivotally mounted to said holding member, and holding means for maintaining said rotary member in a selected angular position relative to said holding member;

said holding means including:

first plate means operatively associated with one of said members and maintained against rotation with respect thereto;

a second plate means operatively associated with the other of said members and maintained against rotation with respect thereto;

said first plate means including a first and second plate element, and said second plate means including a third plate element;

said first plate means including a first and a second plate element, and said second plate means including a third plate element;

said plate elements being arranged in a stack in which said third plate element is sandwiched between said first and second plate elements in face-to-face relationship;

clamping means for compressing said stack whereby confronting faces of said first and third plate elements are frictionally engaged and confronting faces of said second and third plate elements are frictionally engaged; and said stack being compressible by said clamping means to create a friction force of sufficient magnitude to maintain said members in selected angular orientation relative to one another.

15. A mechanism as set forth in claim 14 in which confronting faces of said plate elements are relatively flat.

16. A mechanism as set forth in claim 14 in which said first plate means also includes a fourth plate element and said second plate means also includes a fifth plate element, said fourth and fifth plate elements being in said stack with said fifth plate element sandwiched between said second and fourth plate elements in face-to-face relationship.

17. A mechanism as set forth in claim 16 in which all of said plate elements are essentially of the same size and shape.

18. A mechanism as set forth in claim 17 in which confronting faces of said plate elements are relatively flat.

* * * * *